March 11, 1958     J. M. LANG ET AL     2,826,120
MECHANISM FOR EJECTING ROCKETS FROM AN AIRCRAFT
Filed July 29, 1952     10 Sheets-Sheet 1

FIG. 1

INVENTORS
JOHN M. LANG
RICHARD P. GRAHAM
BY
ATTORNEYS

March 11, 1958 J. M. LANG ET AL 2,826,120
MECHANISM FOR EJECTING ROCKETS FROM AN AIRCRAFT
Filed July 29, 1952 10 Sheets-Sheet 4

INVENTORS
JOHN M. LANG
RICHARD P. GRAHAM
BY
ATTORNEYS

March 11, 1958 J. M. LANG ET AL 2,826,120
MECHANISM FOR EJECTING ROCKETS FROM AN AIRCRAFT
Filed July 29, 1952 10 Sheets-Sheet 5
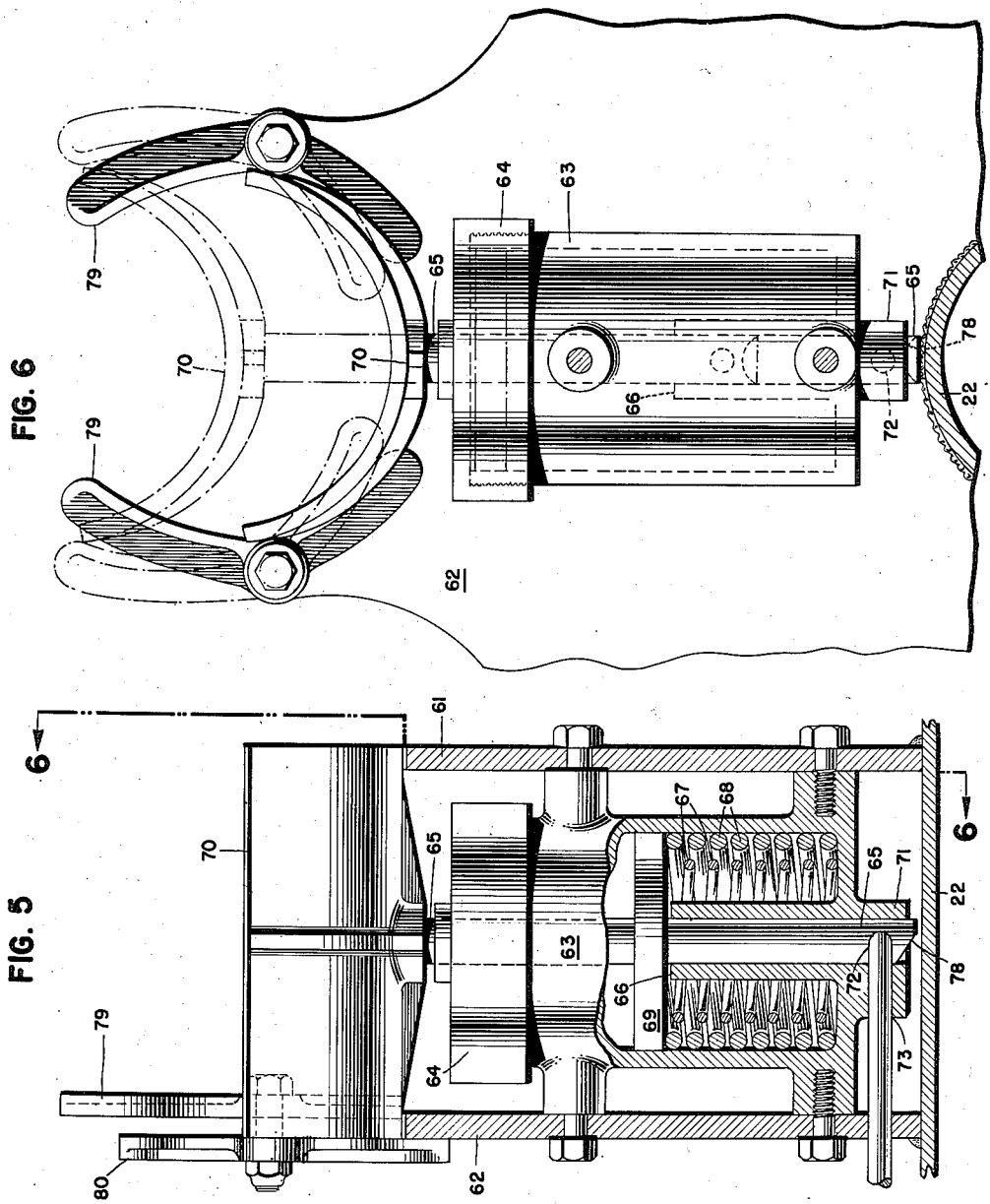
INVENTORS
JOHN M. LANG
RICHARD P. GRAHAM
BY
ATTORNEYS March 11, 1958  J. M. LANG ET AL  2,826,120
MECHANISM FOR EJECTING ROCKETS FROM AN AIRCRAFT
Filed July 29, 1952  10 Sheets-Sheet 6
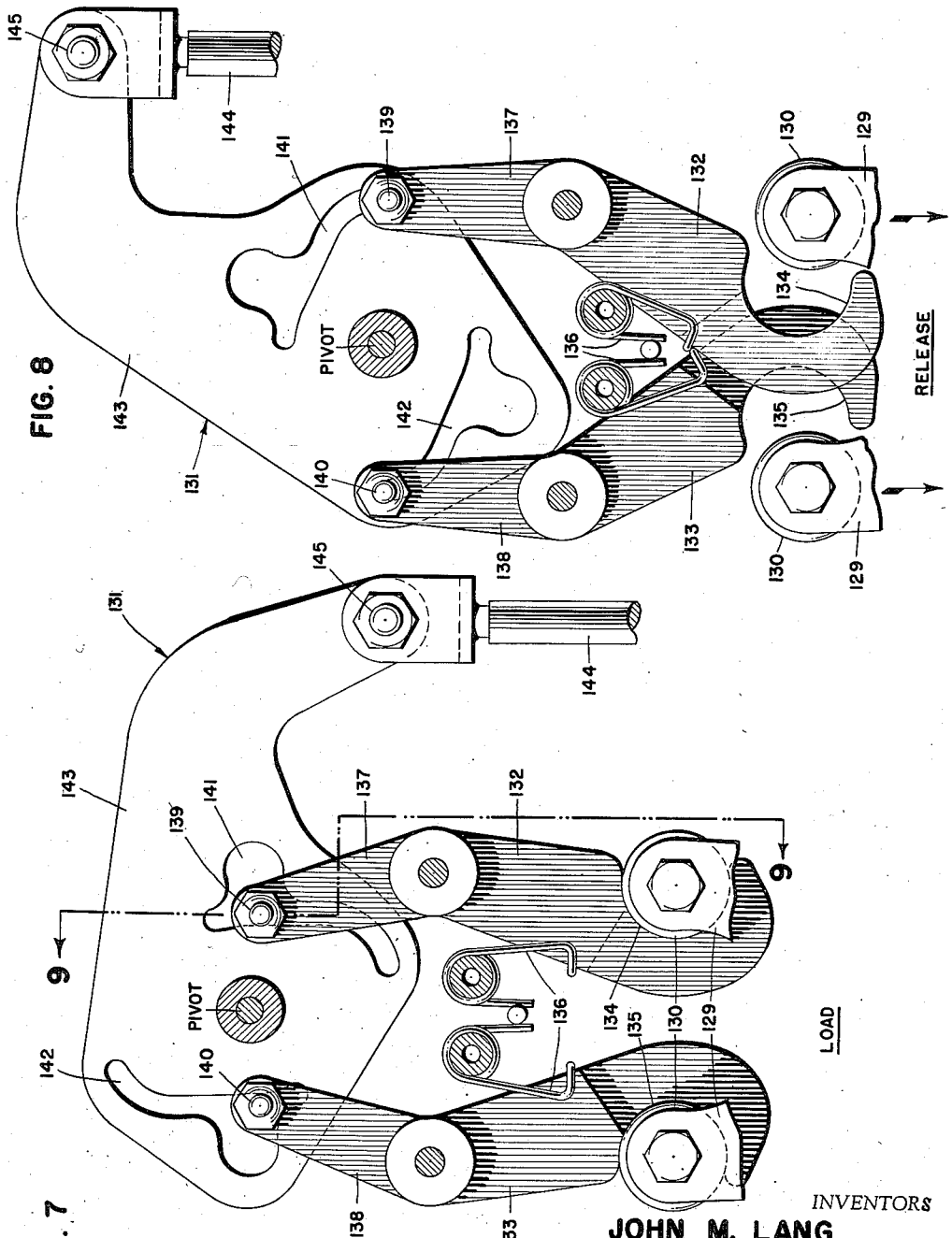
INVENTORS
JOHN M. LANG
RICHARD P. GRAHAM
BY
ATTORNEYS March 11, 1958 J. M. LANG ET AL 2,826,120
MECHANISM FOR EJECTING ROCKETS FROM AN AIRCRAFT
Filed July 29, 1952 10 Sheets-Sheet 7

INVENTORS
JOHN M. LANG
RICHARD P. GRAHAM

BY

ATTORNEYS

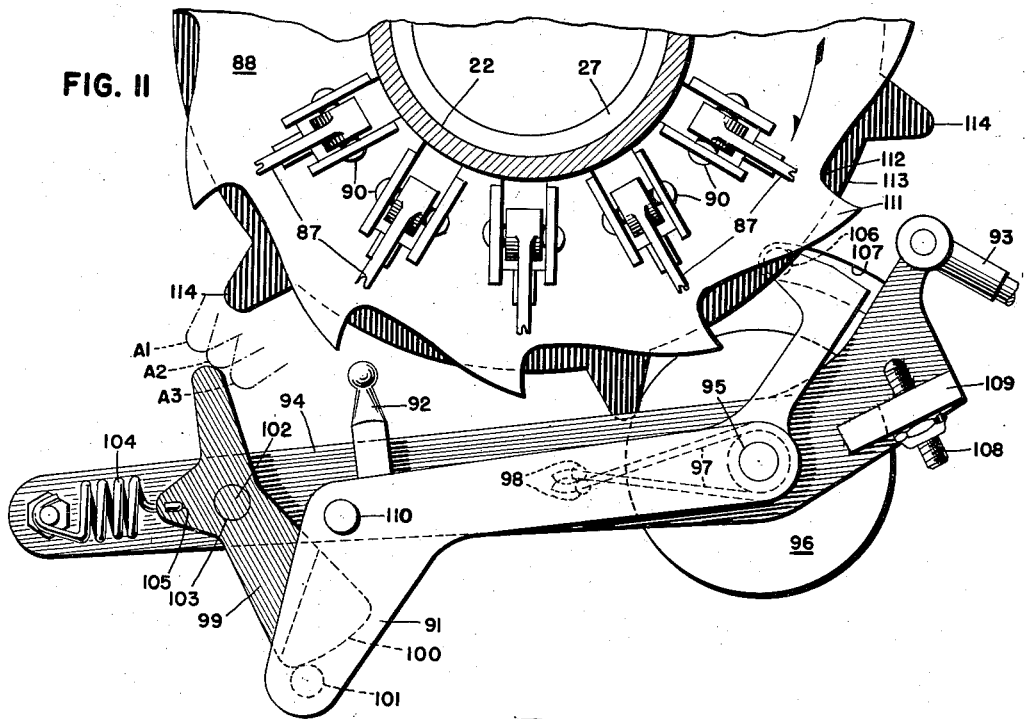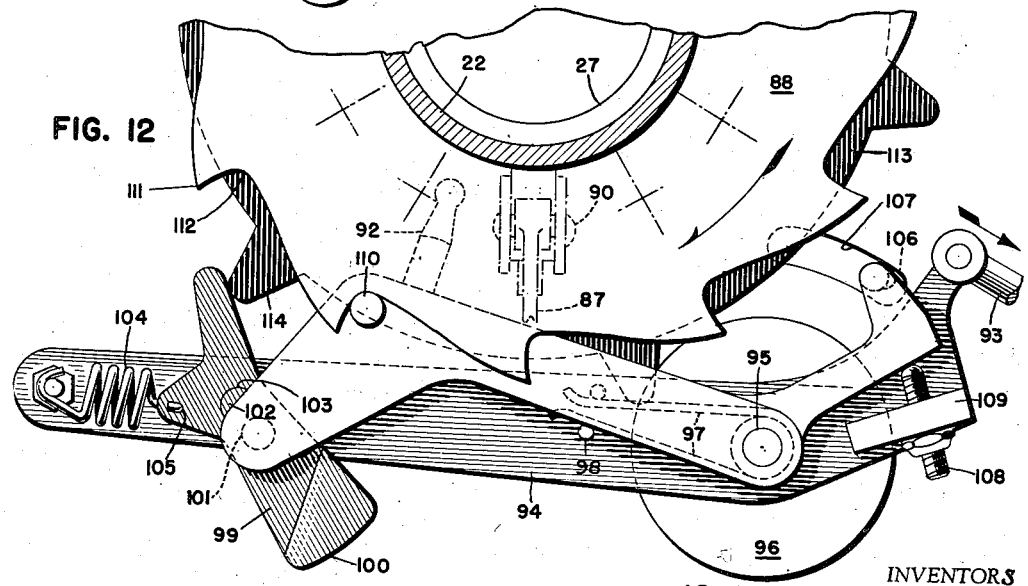

March 11, 1958 J. M. LANG ET AL 2,826,120
MECHANISM FOR EJECTING ROCKETS FROM AN AIRCRAFT
Filed July 29, 1952 10 Sheets-Sheet 9

INVENTORS
JOHN M. LANG
RICHARD P. GRAHAM
BY
ATTORNEYS

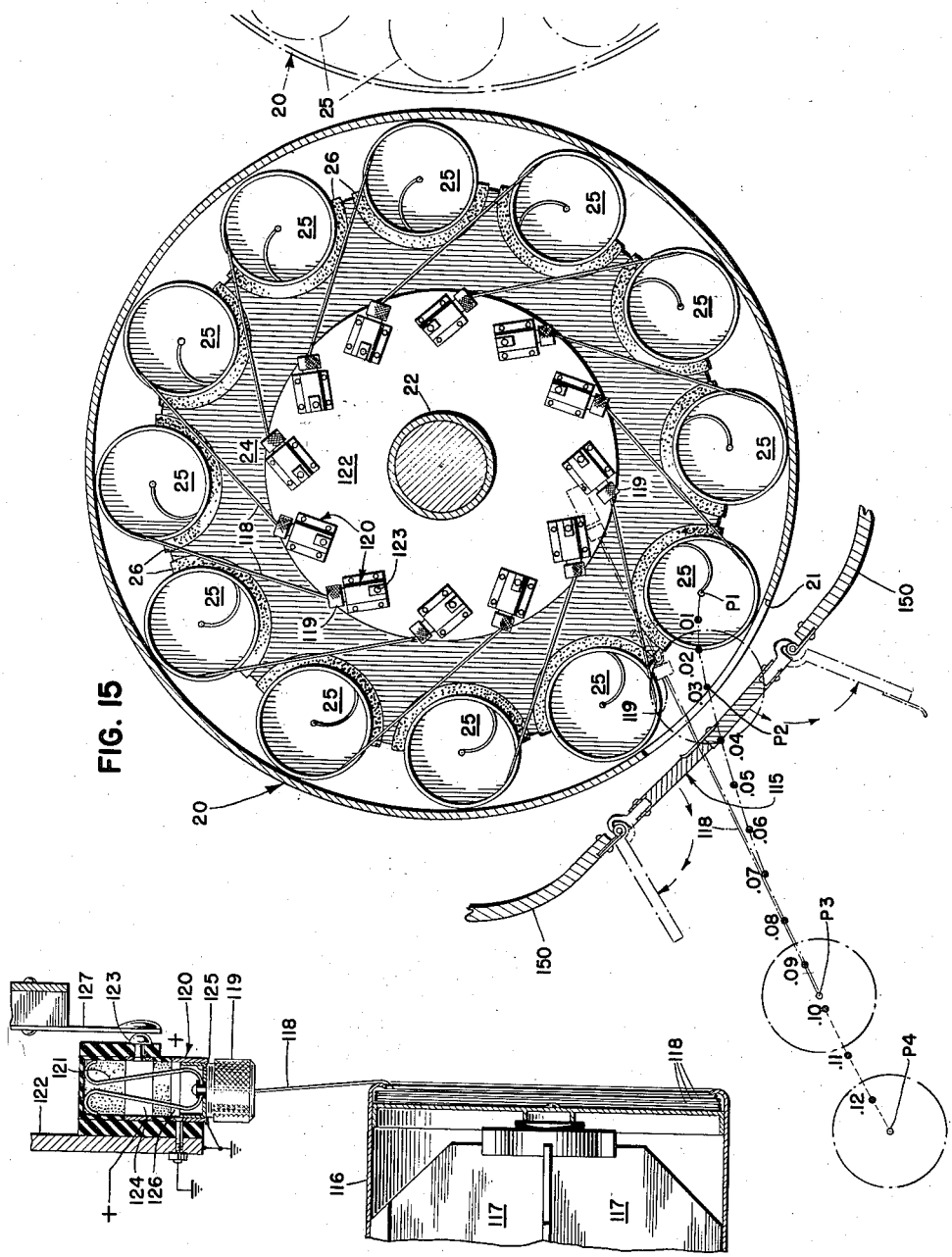

United States Patent Office 2,826,120
Patented Mar. 11, 1958

2,826,120

MECHANISM FOR EJECTING ROCKETS FROM AN AIRCRAFT

John M. Lang, Lockport, N. Y., and Richard P. Graham, Stratford, Conn., assignors, by mesne assignments, to Chance Vought Aircraft, Incorporated, a corporation of Delaware Application July 29, 1952, Serial No. 301,556

6 Claims. (Cl. 89—1.7)

This invention relates to a rocket launcher and more particularly to a device for launching rockets from aircraft at right angles thereto so that the longitudinal center line of the rocket is approximately parallel to the line of flight of the aircraft.

A rocket launcher which is used in launchings from swiftly moving aircraft should be light in weight, must be relatively compact in structure, should preferably be positioned on the aircraft in such manner that no drag is added, must be capable of firing a large number of rockets at a rapid rate, and should have relatively few exposed openings which increase the turbulence to affect the performance of the plane and disturb the aim of the rockets.

There are presently two basic methods used in launching rockets, namely, the rail type and tube type launchers, each of which possesses attendant disadvantages which renders its use in aircraft installations infeasible. The rail type launcher utilizes an individual launcher for each rocket and consequently when used in launching multiple rockets requires considerable space, consumes a great deal of time which limits the rate of fire, and necessitates a costly, complex mechanical structure which adds greatly to the weight and drag of the aircraft to adversely affect its overall performance. Tube type launchers may be either of the reloadable or non-reloadable type, neither of which meets the requirements necessary to render satisfactory performance in aircraft launchings. Non-reloadable tubes usually have a plurality of openings through which the rockeets are launched to create additional turbulence for each tube opening, whereas reloadable launchers are limited in their rate of fire to the total time consumed in firing the rockets and in operating the reloading mechanism. Thus all of the launchers heretofore known, posses distinct disadvantages which make them inadequate for use in multiple launching systems for aircraft.

The present invention eliminates drag on the aircraft and decreases the space required for the launcher by inserting within the body of the aircraft a light, compact unit which is relatively simple in mechanical structure and yet capable of carrying a large number of rockets. The launcher may consist generally of a rotor and a driving assembly therefor, an ejector assembly, a timing mechanism for the ejectors, and an ignition system for firing the rockets. The rockets are mounted circumferentially about the rotor shaft and are launched by the action of a spring-operated ejector contacting each of the rockets and mounted radially on the rotor so as to eject the rockets at a predetermined position in the rotation of the shaft at right angles to the rotor and consequently to the line of flight of the aircraft. Each rocket is ejected as it passes the predetermined position, but is prevented from firing until the passing of a time delay interval which allows the rocket to be free from the aircraft structure before ignition. The time delay is produced by the use of lanyard firing which electrically ignites the rocket only when the lanyard is completely extended to contact a source of electrical energy within the aircraft, at which time the rocket is fired so that its line of flight is parallel to that of the aircraft. The rate of fire may be controlled by the speed of the rotor and the number of rockets within the launcher and is limited only by the spacing required between the rockets to prevent inter-action of their respective air streams. By positively ejecting each of the rockets, faulty missiles are propelled into free space where their weight is no longer a burden on the aircraft and where a later mis-fire cannot cause serious damage.

Accordingly an object of the present invention is the provision of a light, compact aircraft rocket launcher which does not add appreciably to the turbulence or drag of the aircraft.

Another object is to provide a launcher which ejects rockets at right angles to the line of flight of the aircraft.

A further object is to provide a rocket launcher for aircraft which is readily accessible for loading and which prevents mis-fire of the rockets during the loading operation.

A still further object is the provision of a rocket launcher which ejects rockets at right angles to the aircraft but delays the ignition of the rockets until they are clear of the aircraft structure.

Still another object is the provision of a rocket launcher for aircraft which positively ejects all dud rockets and which therefore reduces the possibility of mis-fire within the launcher.

Another object is to provide an aircraft rocket launcher which ejects rockets at right angles to the aircraft and fires the rockets after a predetermined interval so that their line of flight is parallel to that of the aircraft.

Yet another object is the provision of a launcher for a large number of rockets which has a rapid rate of fire limited only by the desired spacing between successive rockets.

Other objects and many of the attendant advantages of this invention will be readily appreciated as the same becomes better understood by reference to the following detailed description when considered in connection with the accompanying drawings wherein:

Fig. 1 is a side elevation view, partly in section, of the forward portion of a launcher which is a preferred embodiment of the invention;

Fig. 5 is an enlarged side elevation view, partly in section, of one of the ejectors of the assembly shown in Fig. 4;

Fig. 6 shows a section of the ejector taken on a line substantially corresponding to line 6—6 of Fig. 5;

Fig. 7 is an enlarged front view of the locking mechanism illustrated in Fig. 3 shown in its locked position;

Fig. 8 shows a changed position view, similar to Fig. 13, of the locking mechanism in its unlocked position;

Fig. 11 is an enlarged view, partly in section, of the timing mechanism used in the embodiment of Fig. 1 and shown in its safe position;

Fig. 12 is a changed position view similar to Fig. 11 showing the timing mechanism in its firing position;

Fig. 15 shows a section of the device taken on a line substantially corresponding to line 15—15 of Fig. 2 and illustrating the rocket firing system; and Fig. 16 is an enlarged view, partly in section, showing the details of the lanyard firing mechanism.

Figure 2:
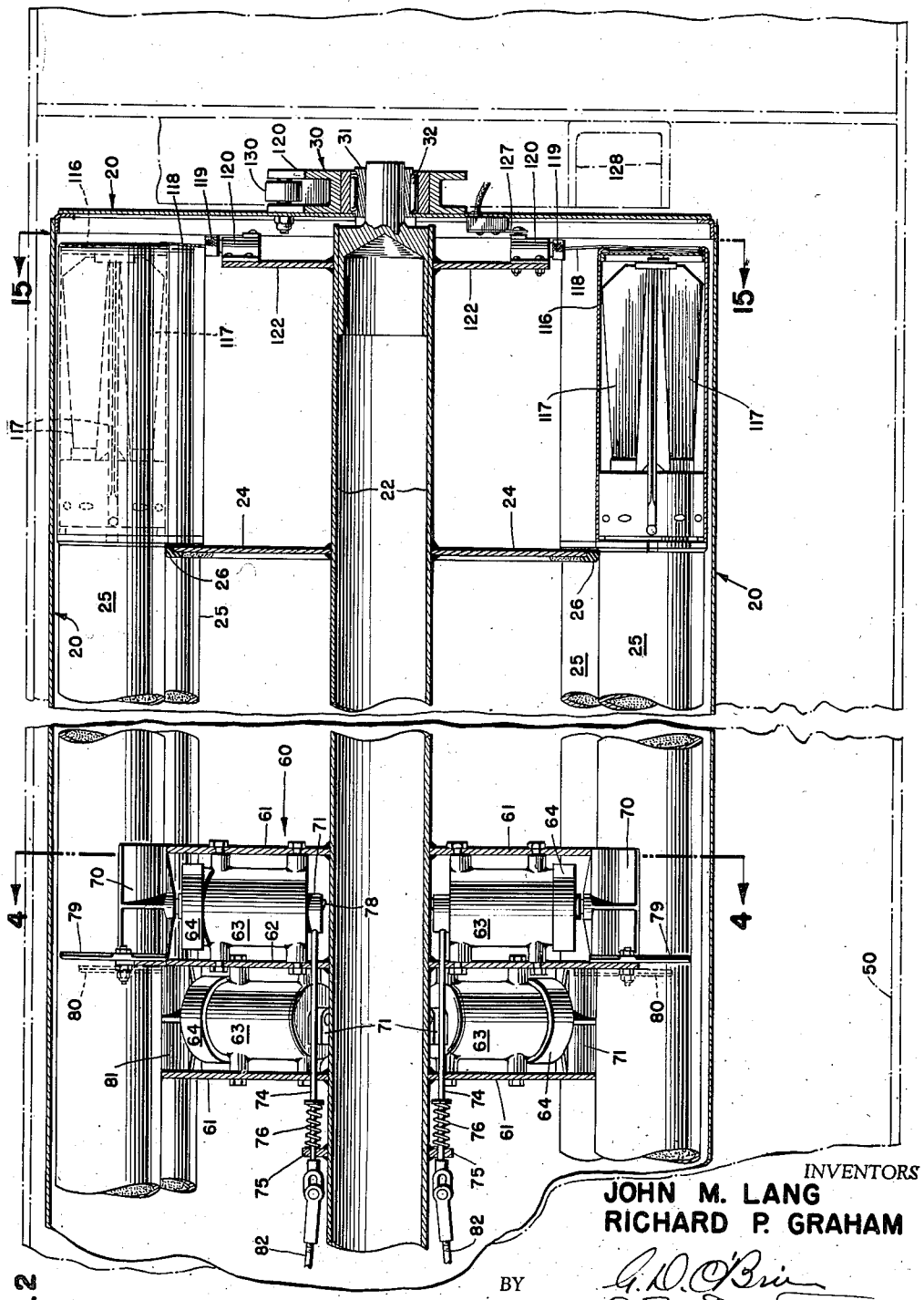
Fig. 2 shows a side elevation, partly in section, of the rear portion of the embodiment of Fig. 1.

Referring now to the drawings, wherein like reference characters designate like or corresponding parts throughout the several views, there is shown in Fig. 1 (which illustrates a preferred embodiment) a pair of similar rocket carrying drums 20 which are positioned parallel to each other within the body of an aircraft and each of which is provided with a lengthwise opening 21 in its outer surface. Positioned within the drum and encircling its longitudinal axis so as to be parallel to the lengthwise opening is a hollow rotor 22 to which is secured a front rocket support rack 23 and a rear rocket support rack 24. Each of the rocket support racks may be provided with a plurality of circumferential slots which are aligned in pairs so that each pair forms a rocket carrying position within the drum. In this manner rockets 25 are carried upon the support racks in parallel, circumferentially spaced positions about the rotor. Each of the slots in the support rack may be provided with a pad 26 of rubber or other suitable cushioning material to properly seat the rockets in the slots and to absorb shock and vibration.

Emerging through an opening in the front face of the drum and telescoping within one end of the hollow rotor is a fitting 27 which rotates within a roller bearing 28 contained within a mounting assembly 29 secured to the front face of the drum. A second mounting assembly 30, having a transverse opening in which is positioned a roller bearing 31, is bolted to the rear face of the drum so that a rear fitting 32, which telescopes within the rear portion of the hollow rotor, is journaled therein.

Figure 3:
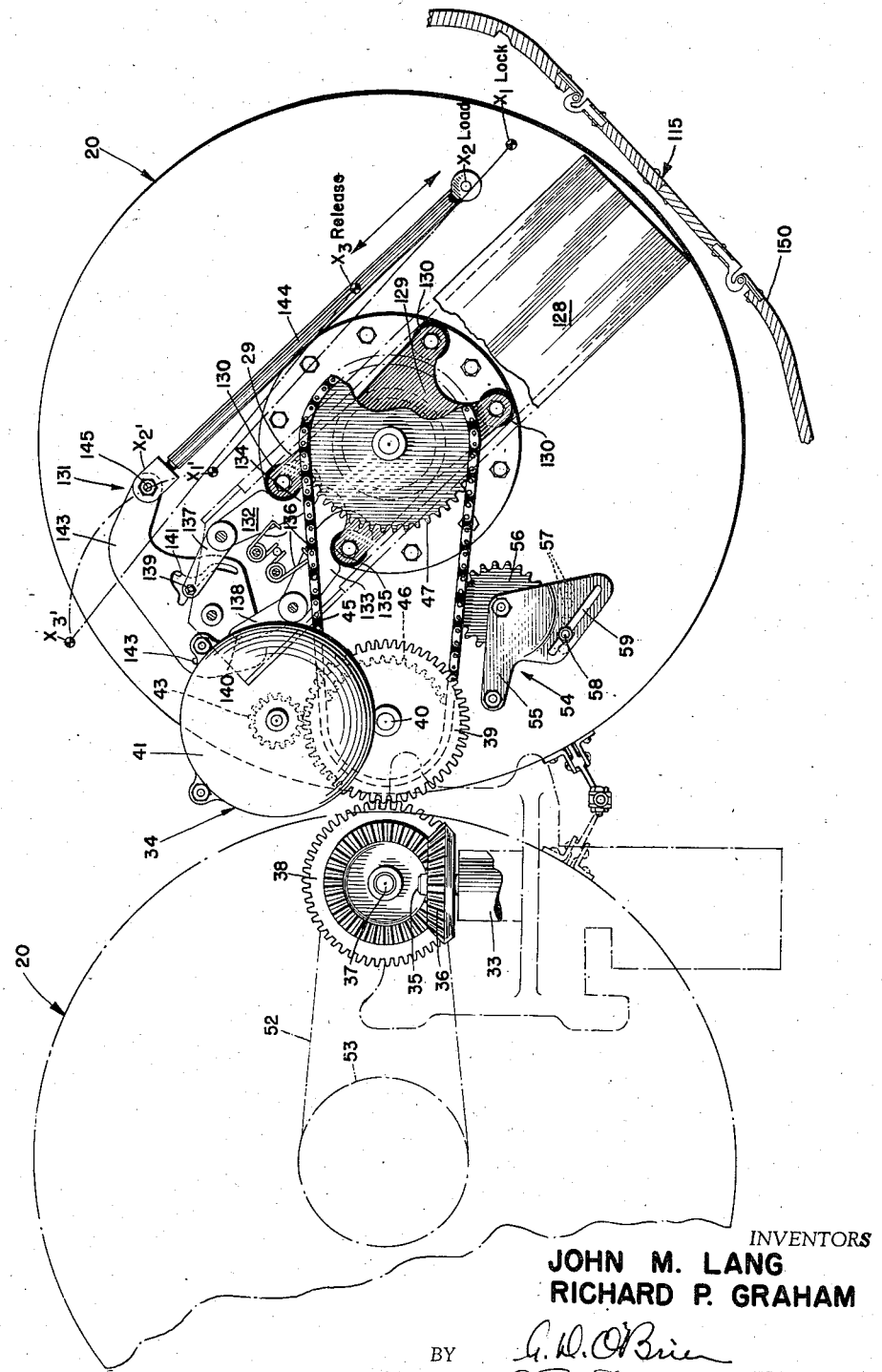
Fig. 3 is a front view of the embodiment shown in Fig. 1.
Figure 4:
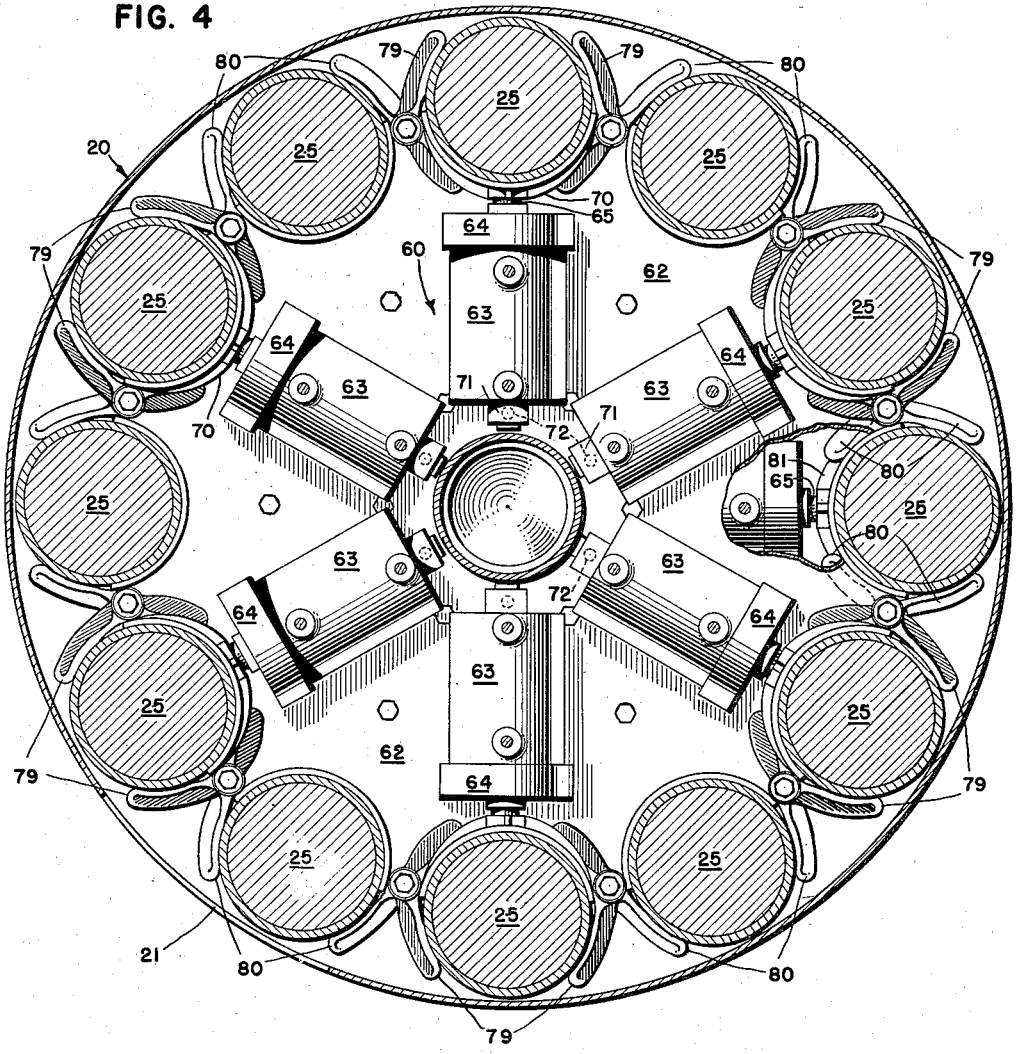
Fig. 4 illustrates a section of the device taken on a line substantially corresponding to line 4—4 of Fig. 2 and showing the ejector assembly used in the embodiment of Fig. 1.
Figure 10:
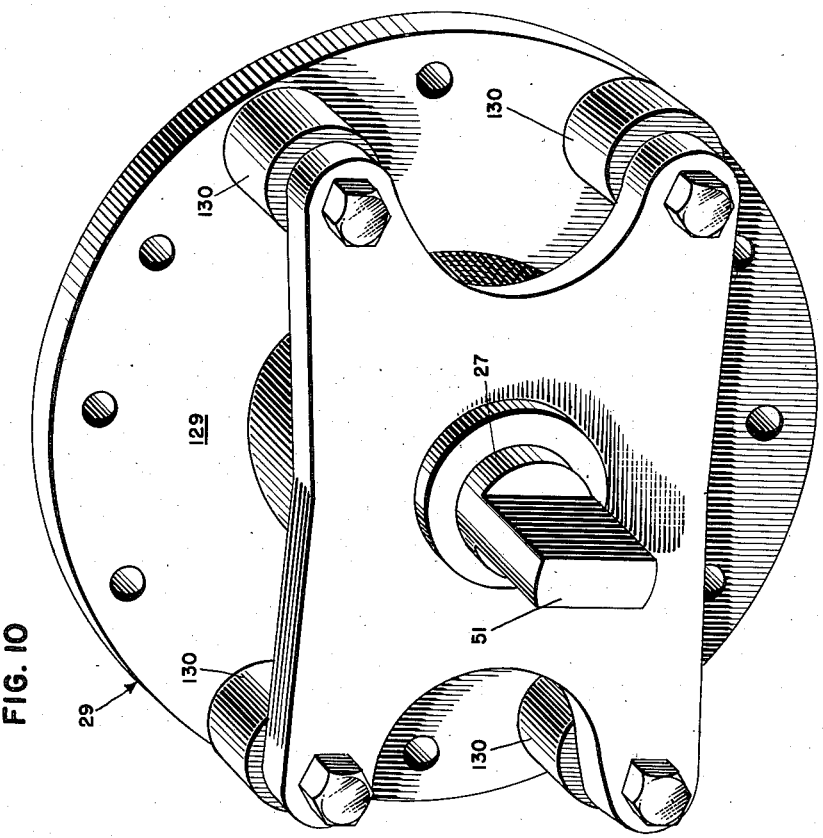
Fig. 10 shows an enlarged perspective view of the mounting assembly and rolling mechanism shown in Fig. 3.
Figure 9:
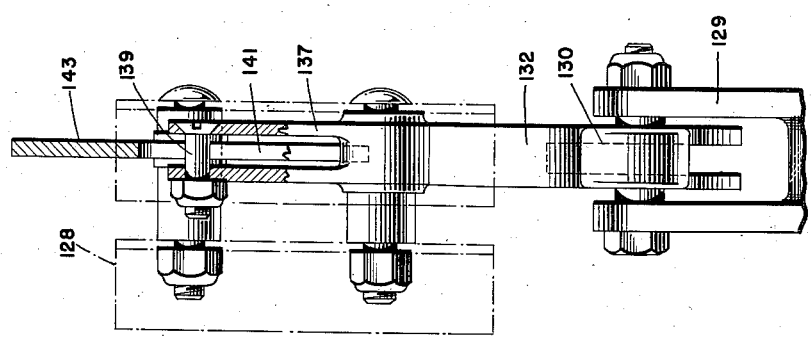
Fig. 9 illustrates a section of the locking mechanism taken on a line substantially corresponding to line 9—9 of Fig. 7.

The rotation of a rotary actuator 33, which may be driven by any conventional method such as electrically, pneumatically, hydraulically or by explosives, is transmitted through a driving assembly indicated generally as 34 to the fitting 27 and consequently to the rotor. As shown in Fig. 3 the driving assembly includes a shaft 35 driven directly by the actuator and a pair of miter gears 36 which rotate the axis of the driving torque by 90° to turn a drive shaft 37 at right angles to the actuator shaft 35. Mounted on the drive shaft 37 is a driving gear 38 which engages a reversing gear 39 to impart the rotary movement of the actuator to a shaft 40 positioned parallel to the drive shaft 37. The speed of the actuator may be maintained within the limits of 80 to 85 R. P. M. by a conventional centrifugal ball type governor 41 which actuates a switch 42 to control the energization of the actuator. Rotary motion is imparted to the governor 41 by a pinion gear 43 mounted on the shaft of the governor and driven by the reversing gear 39 mounted on the shaft 37. Rotation of the shaft 40 is transmitted to a main drive shaft 44 positioned parallel thereto by a chain 45 which engages a pair of sprockets 46 and 47 mounted respectviely on the parallel shafts 40 and 44. The main drive shaft 44, which is journaled within a bearing unit 48 secured to structure 50 of the aircraft, may be provided with a tongue engaging slot 49 at one end for receiving a tongue 51 of the fitting 27 to connect the fitting to the main drive shaft and complete the transmission of rotary motion from the actuator 33 to the rotor 22 which is secured to the fitting. The rotary motion of the rotor 22 is of sufficient velocity to cause substantial centrifugal forces to be exerted against the rotor carried rockets to thereby materially assist in the ejection operation when the rockets are sequentially released.

The rotor of the second drum is turned at the same speed but in an opposite direction from that of the first drum by means of a chain 52 which interconnects a sprocket 53 mounted on the drive shaft of the second rotor and a sprocket mounted on the shaft 37. Since the shaft 37 and the shaft 40 parallel thereto are rotated in opposite directions by use of the drive gear 38 and reversing gear 39, it is obvious that the sprocket and chain assemblies rotating the two rotors will cause the rotors to be turned in opposite directions within their respective drums.

To maintain proper tension on the chain 45 and to thus assure sufficient driving torque for the rotor 22, an idler assembly 54 is moved into engagement with the chain to raise the chain and thus take up any excess slack that might be present. The assembly includes a bifurcated arm 55 pivotally mounted on the aircraft structure 50 and a sprocket 56 contacting the chain 45 and rotatably mounted within the bifurcation of the arm. The structure 50 is provided with a plurality of aligned apertures 57 for receiving an adjusting bolt 58 which is placed within an elongated slot 59 in the arm 55 at a position determined by the desired tension on the chain. The position of the sprocket 56 may be adjusted to maintain approximately constant tension on the chain by changing the position of the bolt 58 within the slot 59 for a minor deviation in tension or by placing the bolt in a different aperture 57 in case a more substantial adjustment is required. Both adjustments cause the arm 55 to pivot on the structure 50 to move the sprocket into or out of engagement with the chain 45 whereby the lower portion of the chain is raised to increase the tension or is lowered to decrease the tension as the need arises.

Supporting the rockets 25 in their spaced positions at approximately their center of gravity is an ejector assembly indicated generally as 60 and including a pair of outer struts 61 and a center strut 62 secured to the rotor 22. A plurality of ejector cylinders 63 are mounted between each of the outer struts 61 and the center strut 62 so as to form a double bank of cylinders radially positioned about the rotor (Fig. 2). Each of the ejector cylinders 63 may be provided with an apertured cylinder head 64 and a plunger 65 which passes through the aperture in the head, extends longitudinally along the axis of the cylinder, and fits within a guiding sleeve 66 formed integral with and projecting upwards from the base of the cylinder. An inner compression spring 67 and an outer compression spring 68, which surround the plunger and the sleeve so as to be concentric with each other, are compressed between the cylinder base and a plunger head 69 fitting within the cylinder and secured to the plunger, whereby the plunger head and the plunger are normally urged outward away from the rotor.

The rocket 25 rests upon a yoke 70 attached to the outer end of the plunger so that, when the rocket is placed in one of the rocket carrying positions on the support racks 23 and 24, the plunger is forced towards the rotor to compress the springs 67 and 68 within the cylinder. This movement of the plunger towards the rotor causes the plunger to move downward within the sleeve 66 until the lower end thereof passes through a truncated elliptical collar 71 which protrudes below the base of the cylinder. The plunger continues its downward movement until an aperture 72 in its lower end becomes aligned with an opening 73 in the collar 71 at which time a locking pin 74, mounted parallel to the rotor on a guide 75 and passing through openings in the struts 61 and 62 and the opening in the collar, becomes exposed to the aligned apertures 72 and 73. The locking pin 74 is free to move longitudinally along the length of the opening 73 but is normally forced to the right as viewed in Fig. 2 by a pin return spring 76 which encompasses a portion of the locking pin and is compressed between the guide 74 and a lug 77 on the locking pin.

The plunger is provided with a tapered lower end 78 which gradually forces the locking pin back lengthwise through the opening 73 to compress the pin return spring 76 as the plunger moves downward until the aperture 72 becomes aligned with the opening 73, whereupon the pin return spring expands to force the locking pin into positive engagement with the aperture 72 to lock the plunger in its compressed position.

Movement of the plunger 65 towards the rotor by placing a rocket in a rocket carrying position also causes the yoke 70 to contact a pair of rocker arms 79, pivotally mounted on one side of the center strut, to thereby pivot the arms and force them to close to grip and firmly hold the rockets in position. When the plunger is locked in its compressed position by the locking pin 74 the yoke 70 is likewise locked in its inner position as shown in Fig. 6 to maintain the rocker arms in engagement with the rocket and to thus prevent movement of the rocket. A second pair of rocker arms 80 pivotally secured to other side of the center strut engages the next succeeding rocket which is placed in the next rocket carrying position in the drum to hold it in position on a yoke 81 of the second bank of ejectors. In this manner each successive rocket is grasped by an ejector in a different one of the banks and, manifestly, alternate rockets are engaged by ejectors in the same bank.

A firing rod 82, mounted at a slight angle with respect to the rotor and extending through an opening in the front support rack 23, interconnects the ejector assembly and a firing mechanism 83 positioned near the front face of the drum. A connecting pin 84, attached to one end of the firing rod, inserts within an oval shaped slot 85 in a release cap 86 which is secured to the locking pin 74. The rod 82 may be connected at its other end to a bellcrank 87 which is mounted on a camming disk 88 secured to the rotor. The camming disk is provided with a plurality of apertures spaced about the rotor and through each of which extends a lever 89, one end of which is connected to the bellcrank 87 and the other end of which protrudes beyond the front surface of the camming disc. Movement of the lever causes the bellcrank to move about its pivot point 90 to thus draw the rod 82 forward toward the front face of the drum. Forward movement of the rod causes the pin 84 to contact one extremity of the oval slot 85 in the release cap to thus move forward the cap and the locking pin 74 secured thereto. This movement of the locking pin withdraws the pin 74 from the aperture 72 in the plunger and moves it longitudinally along the opening 73 in the collar 71. The springs 67 and 68 immediately expand to force the plunger outward away from the rotor since the locking pin no longer engages the aperture 72 to maintain the springs in a compressed position.

To actuate the lever a hammer 91 having a trigger 92 attached thereto is directed toward the camming disk and consequently toward the lever by means of a hand controlled rod 93 which may be operated from the cockpit of the aircraft. The control 93 may be selectively moved to either of two desired positions to control the position of a carriage 94 and the trigger. The first of these positions, called the "safe" or "off" position, is illustrated in Fig. 11 and is employed when it is desired to maintain the trigger free from the camming disk and the lever whereby the ejector mechanism is prevented from being released. To attain this position the hand control is moved to the "safe" position, to thereby rotate in a counterclockwise direction the carriage 94 pivotally mounted on a stub shaft 95 secured to a flanged mounting pad 96 which is attached to the inner surface of the front face of the drum. The stub shaft with its associated mounting pad serves as a fulcrum about which the carriage 94 and the hammer 91 are pivoted.

When the control rod is placed in the "safe" position the carriage occupies its extreme counterclockwise position and the trigger 92 is moved out of contact with the lever 89. In this position the hammer 91 may be manually turned further in a counterclockwise direction to compress a U-shaped spring 97 which surrounds the flange on the mounting pad 96 and is held between a pair of spring retaining pins 98, one of which is attached to the carriage 94 and the other to the hammer 91. The hammer may be cocked in this position by manually rotating a cam engaging finger 99, which may be provided with a raised portion 100, in a clockwise direction so that the raised portion engages a safety locking stub 101 secured to the hammer as shown in Fig. 11. The finger 99 is pivotally mounted on an insert 102 which extends through an aperture in the carriage 94 and fits within an aperture 103 in the finger. A finger return tension spring 104, having one end secured to the carriage 94 and the other end inserted within an aperture 105 in the finger 99, normally urges the cam engaging finger to occupy the position shown in Fig. 12 so that this spring resists rotation of the finger in either a clockwise or a counterclockwise direction.

The "safe" position of the firing mechanism is generally used in loading rockets within the drum, at which time it is important that the trigger 92 be kept out of contact with the lever 89, for if the trigger should engage the lever to release the ejecting mechanism, rockets would be released to wreck havoc on operating personnel and nearby installations and equipment. To insure that the inadvertent release of rockets will not occur, the operator manually rotates the hammer 91 in a counterclockwise direction until the safety locking stub 101 reaches a position below the lower extremity of the finger 99. In this position the finger 99 may be manually rotated in a clockwise direction until the raised portion 100 contacts the locking stub 101 to firmly lock the trigger 92 in its disengaged position.

To guide the movement of the hammer and to limit the extent of its rotation a guiding stub 106 secured to one end of the hammer fits within an arcuate slot 107 in the front face of the drum. When the hammer is locked in its disengaged position as shown in Fig. 11 the stub 106 occupies a position in the extreme left portion of the slot 107 and further rotation of the hammer in a counterclockwise direction is impossible.

Figure 13:
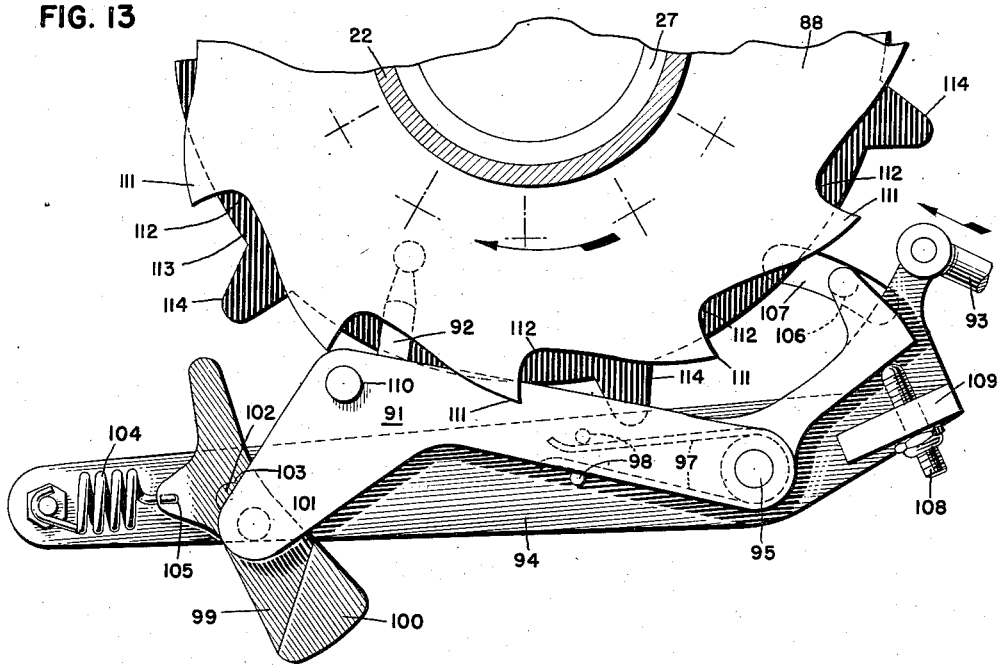
Fig. 13 shows a changed position view similar to Fig. 12 illustrating the timing mechanism in its off-firing position.
Figure 14:
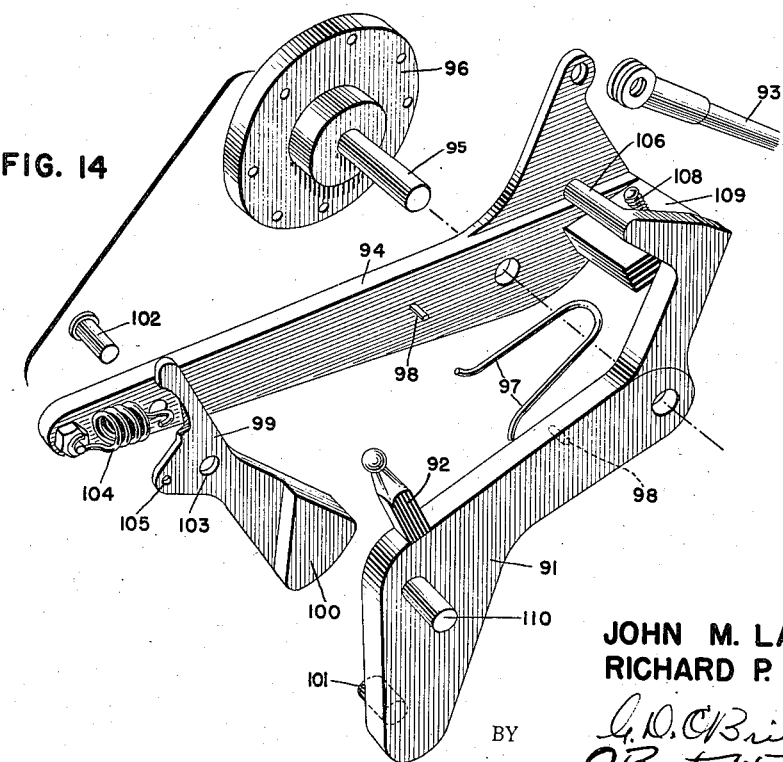
Fig. 14 is an exploded perspective view showing the disassembled parts of the timing mechanism of Fig. 11.

After the rockets have been safely loaded within the drum, the operator may release the hammer from its locked position by manually rotating the finger 99 in a counterclockwise direction until the raised portion 100 is free from the locking stub 101, at which time the U-shaped spring 97 expands to rotate the hammer in a clockwise direction. With the hand controlled rod 93 still in the "safe" position, the hammer rotates until the bottom of the hammer contacts a threaded stop 108 which is threadedly mounted on a block 109 protruding from the carriage 94. In this position the stub 106 is located at approximately the center of the arcuate slot 107, and the trigger 92 is maintained in a position just out of engagement with the lever 89 as shown in Fig. 13. Slight adjustment of the position of the trigger by the ground maintenance crew of the aircraft may be effected through adjustment of the threaded stop 108 to insure that the lever 89 is not inadvertently actuated by the trigger.

When the aircraft operator desires to fire the rockets the hand controlled rod 93 is moved to its second position, designated the "firing" position and shown in Fig. 12. In this position, the hand controlled rod is moved to its extreme clockwise position and the guiding stub 106 occupies the right portion of the arcuate slot 107. Movement of the control rod moves the carriage 94 and the threaded stop 108 to their extreme clockwise positions, and thus permits the U-shaped spring 97 to expand further whereby the hammer 91 and the trigger 92 are rotated in a clockwise direction until the trigger contacts one of the levers 89. Actuation of the lever causes the bell crank 87 to move the firing rod 82 forward toward the front face of the drum, whereupon the locking pin 74 is withdrawn from the aperture 72 to release the ejector mechanism and propel one of the rockets through the longitudinal opening 21 in the drum. The firing mechanism 83 and the support racks 23 and 24 are positioned with respect to the rotor in such manner that only the rocket which is in registry with the opening is released.

Movement of the hammer toward the camming disc 88 enables a camming stub 110 to engage the outer periphery of the disc 88, which consists of a plurality of teeth 111 and indentations 112. When the stub 110 is located within one of the indentations in the disc periphery, the lever 89 which is positioned nearest that indentation is raised to release the ejecting mechanism associated therewith. Since the rotor 22 and the disc 88 are rotating in a clockwise direction as viewed in Fig. 12 the stub 110 rides upon the outer edge of the disc so as to follow the contour of one of the teeth 111. When the next succeeding lever approaches the trigger 92 the stub is positioned at the outer extremity of one of the teeth of the disc, whereby this lever may be raised to release the next succeeding ejector cylinder when the stub 110 falls into the next succeeding indentation. Thus, when the control rod 93 is placed in the "firing" position, the rockets are automatically ejected in succession until the control rod is moved back to the "off" position. Skillful manipulation of the control rod enables the operator to fire only a few of the rockets if desired, since the number of rockets released depends entirely on the length of time that the control rod is in the "firing" position. Manifestly, if the rod 93 remains in the firing position for one complete rotation of the rotor, the rockets will all be ejected and reloading of the drum at the ground station of the aircraft is necessitated.

If some of the rockets have previously been fired by the operator in a prior operation, then there may be a slight delay in firing the rockets which remain within the drum, inasmuch as the trigger 92 may actuate a lever 89 which controls an ejector cylinder which has previously ejected its rocket. In this case the loaded ejector cylinders will eject their rockets as soon as their associated levers are actuated by the trigger. In any event the maximum time for firing the remainder of the rockets is the time required for one complete rotation of the rotor, which is approximately one eightieth of a minute in the embodiment shown.

If the firing mechanism has been left in the locked "safe" position shown in Fig. 11 by the personnel who loaded the rockets within the drum, it is important that the aircraft operator be able to release the rockets in spite of the locked position of the firing system. To enable the locking means to be released from the cockpit of the aircraft, a safety release disc 113, having a plurality of teats 114 equidistantly spaced on its outer circumference, is mounted on the rotor 22 parallel to the camming disc 88. When the control rod is placed in the "firing" position the carriage 94, the hammer 91 and the finger 99 are moved toward the safety release disc 113. It is apparent from Fig. 11 that the finger may approach one of the teats 114 on the safety release disc at any one of several different angles. If, as shown in position A1 of Fig. 11, the finger 99 is directed toward the under portion of the teat, the finger is rotated clockwise and the locking stub 101 rides the circumference of the finger, permitting no movement of the hammer. If, as shown in position A2, the finger approaches the teat at approximately the dead center position, the resulting action is similar to that which occurs if the finger approaches the disc between two of the teats as shown in position A3. The finger is rotated in a counterclockwise direction by the teat so that the raised portion 100 is moved out of the way of the stub 101 to release the hammer and allow the trigger 92 to actuate the lever 89 and fire the first rocket. After the first rocket is fired, the camming disc imparts an oscillating motion to the spring loaded hammer to continue to fire the rockets in sequence until the carriage is withdrawn by movement of the control rod 93.

Referring now to Fig. 15, it can be seen that just prior to the ejection of the rockets a trap door 115 in the outer surface of the aircraft must be opened to permit the rockets to pass through the opening 21 in the drum and thence through the open door. The trap door consists of a pair of outwardly swinging hinged members and is aligned with the opening in the drum. The rockets are retained on the support racks 23 and 24 and are rotated with the rotor until the particular rocket which is to be ejected approaches the opening in the drum, at which time the rocket is projected outwardly away from the rotor. Each of the rotors may be provided with a canister 116 which telescopes the rear portion of the rocket so as to restrain therein a plurality of spring loaded fins 117. Connected at one end to the center of the canister and helically wound within the rear portion thereof is a dual conductor laniard 118 which is conected at its other end to a plug 119. Secured to the center of the plug and fitting within an open end electrical distributing sylinder 120 is a U-shaped electrically conducting spring 121 which normally contacts an insulating portion of the inner surface of the cylinder. The distributing cylinder is attached to a mounting plate 122 secured to the rotor 22 and is provided with an electrical contact 123 which extends through the wall of the distributing cylinder so as to contact an inner conducting ring 124 positioned therein. The plug 119 may also be provided with a cylindrical contactor 125 which extends within the open end of the distributing cylinder 120 so as to electrically contact a conducting portion 126 of the distributing cylinder wall which is at ground potential.

As shown in Fig. 15, the position P1 represents the release point of the rocket and position P2 represents the free body point, in which position the rocket begins to fall through free space. At this point the path of travel of the rocket will be affected by a force component due to the effect of gravity and by the force due to the ejection mechanism which is directed radially to the rotor. As the rocket reaches the position P3 the laniard has unwound to reach its fully extended length and immediately after the rocket passes the point P3 the laniard pulls the spring 121 until the outer prongs of the spring contact the conducting ring 124. The cylindrical contactor 125 moves along the conducting portion 126 of the distributor cylinder wall, so that the electrical contact 123, which by this time has come into contact with a distributor arm 127 secured to the rear face of the drum, supplies ignition potential for the rocket through the canister 116. Thus, it can be seen that the complete electrical circuit consists of a source of electrical potential (not shown), the distributor arm 127, the electrical contact 123, the conducting ring 124, the U-shaped spring 121, one of the conductors of the laniard 118, the canister 116, the ignition system of the rocket, the other laniard conductor, the cylindrical contactor 125, the conducting portion 126 of the cylinder wall, and thence to the low side of the source. A slight ignition delay occurs subsequent to the application of electrical potential to the ignition system of the rocket, until at the position P4 thrust is generated for the rocket and the canister 116 is blown off the rocket tail to release the rocket fins. In this manner the path of the rocket is approximately parallel to the line of flight of the aircraft and the rocket is prevented from being fired until it is well into free space where firing hazards are reduced to a minimum.

In order to render the drum more accessible so that rockets may be loaded therein, a pair of track guides 128 are secured to the aircraft structure at opposite ends of the drum for slidably mounting the drum to permit it to be lowered in the aircraft whereby the longitudinal opening 21 in the outer periphery of the drum is aligned with the trap door 115 in the outer surface of the aircraft. In this position the rockets 25 may easily be inserted through the trap door and the longitudinal opening to place them in their predetermined positions upon the support racks 23 and 24 within the drum. Movement of the drum upon the track guides is facilitated by the provision of the mounting assemblies 29 and 30 attached respectively to front and rear faces of the drum and each including a channel plate 129 and a plurality of rollers 130 mounted within the channel of the plate so that the rollers contact the sides of the track guide 128. A locking assembly 131 normally holds the drum in its upper position on the track guides so that the tongue 51 of the fitting 27 inserts within the slot 49 of the main drive shaft 44 to rotate the rotor within the drum. In this position a pair of the rollers 130 of the mounting assembly 29 are engaged by a pair of interrelated hooks 132 and 133 which have gripping edges 134 and 135 facing in opposite directions so that each hook grasps the under portion of one of the rollers and hence holds the drum firmly in position. A locking assembly is also provided for the rear mounting assembly 30 to support the rear portion of the drum but is not shown in the drawings, since the locking assembly for the rear portion is identical to the assembly 131 provided for the front portion and shown in Figs. 7 and 8. The extending hooks 132 and 133 are normally urged into contact with the rollers by means of torsion springs 136 which are mounted on the track guide 128 and are pressed against the inner surfaces of the hooks to cause them to spread apart. Pivotally connected to the upper end of the hooks are a pair of link arms 137 and 138 which are provided at their unconnected ends with guide pins 139 and 140 respectively. The guide pins move within a pair of slots 141 and 142 in a connecting arm 143 which is pivotally mounted on the track guide 128 and which connects the link arms controlling the gripping hooks to a hand operated control rod 144. Slots 141 and 142 are of similar configuration, the shape of which is determined by the desired path which the guide pins should follow to control the position of the hooks. Each of the slots consists of a long narrow circumferential portion of a width approximately equal to the diameter of the guide pins, an enlarged portion which permits free movement of the pins, and a short narrow portion which restricts the movement of the pins. The circumferential portions of the slots are positioned complementary to each other so that as the guide pin in one of the slots moves from top to bottom the guide pin in the other slot moves from bottom to top. In this manner the hooks 132 and 133 move outwardly together or are simultaneously forced toward each other depending upon whether it is desired to lock or unlock the drum.

The control rod 144 may be selectively moved to any of three desired positions to control the position of the hooks and hence to lock or release the drum. In the first of these positions designated the "lock" position, the control rod is moved to its extreme lower position X1 to likewise move a pivot pin 145, which connects the arm 143 and the control rod, to its lowermost position X1'. The guide pin 139 occupies the extreme upper position in the small narrow portion of the slot 141, and, correspondingly, the guide pin 140 occupies the extreme lower position in the small narrow portion of the slot 142. The hooks are thus spread apart by the springs 136 to engage the rollers 130 and lock the drum in position on the track guide.

To release the locking assembly and render the mounting assemblies for the drum free to roll upon the track guides, the control rod is moved in a counterclockwise direction to the position marked X2, which is shown in Fig. 3 and designated the "load" position. The pivot pin is thus moved to the X2' position and the guide pins occupy the enlarged portions of their respective slots so as to be free to move therein as illustrated in Fig. 7. In this position, the drum may be forced downward on the track guides so that the rollers 130 contact the sloping heads of each of the hooks to force the hooks inward against the action of the torsion springs 136 until the rollers have passed over the tips of the hooks. The drum is free to move only if the rotor is properly indexed to a loading position for the rockets, since only in such a position may the tongue 51 of the fitting 27 become disengaged from the slot 49 in the main drive shaft. In the loading position the slot and the tongue are parallel to the sides of the track guide so that when the drum moves downward the tongue slides out of the slot to thus become disengaged. At all positions of the rotor except a loading position the tongue and the slot are at some acute angle to the track guide so that the tongue cannot be disengaged when an attempt is made to move the drum downward on the track guide. Therefore the drum may be moved on the track guide only when the rotor is indexed to a loading position, for in any other position the tongue 51 cannot slide from the slot 49.

The control rod may then be moved to the X3 or "release" position to move the pivot pin to the X3' position and thus lock the hooks in their innermost position as shown in Fig. 8 so that the rollers are free to move on the track guides. The guide pin 139 occupies the lower extremity of the long, narrow, circumferential portion of the slot 141 and the guide pin 140 occupies the upper extremity of the narrow circumferential portion of the slot 142 to lock the hooks in their displaced positions free of the rollers. The drum is then dropped downward in the body of the aircraft as the rollers move on the sides of the track guides until the longitudinal opening 21 in the drum is exposed to the trap door 115 in the outer surface of the aircraft, at which position rockets may be readily inserted within the drum.

When the rotor is properly indexed to a loading position, one pair of the aligned circumferential slots in the support racks 23 and 24 is directly exposed to the opening 21 in the drum so that when the drum is moved downward on the track guide, a rocket may be inserted through the trap door 115 in the aircraft, through the opening in the drum and is placed in position on the aligned slots of the support racks. The rotor may now be turned by hand since the tongue 51 has become disengaged from the slot 49 until the next pair of aligned slots on the support racks becomes exposed to the opening in the drum to receive another rocket.

As each of the rockets is inserted through the openings, the body of the rocket contacts the yoke 70 at approximately the center of gravity of the rocket and further movement of the rocket toward the rotor causes the rocker arms 79 to pivot about their fulcrum to encircle the rocket and hold it firmly on the yoke. Movement of the rocket and the yoke toward the rotor causes the plunger 65 to move within the cylinder 63 until the opening 72 becomes aligned with the opening 73, at which time the spring pressed locking pin 74 inserts into the opening 72 to lock the plunger in its compressed position. This procedure is repeated until all of the pairs of slots and all of the yokes have been loaded with rockets, so that when the loading operation is complete the rockets are loaded in position parallel to the rotor and circumferentially spaced on the support racks. After the launcher is fully loaded, the drum may be raised on the track guide and the control rod 144 moved to the "load" position so that the guide pins 139 and 140 again occupy the enlarged portions of the slots 141 and 142. The rollers 130 of the drum then contact the tips of the hooks 132 and 133 to force the hooks back against the pressure of the springs 136 so that the hooks snap back into the "locked" position and the guide pins occupy the small narrow portion of their respective slots. Of course, the rotor again must be indexed to a load position so that the tongue 51 inserts within the slot 49 to enable the actuator 33 to turn the rotor when the drum is placed in its locked position on the track guides.

In some instances where time is of the essence, the above outlined procedure of loading the rockets may be undesirable because of the relative slowness of the operation. An alternate procedure that is more expeditious is the complete removal of the drums 20, which are used to house the rockets and their associated firing mechanisms, from the bay of an aircraft and the replacement thereof with preloaded drums. In order to facilitate the removal and addition of the drums 20 the trap door 115 may be built into quickly removable rocket bay access panels 150 which may be detached from the fuselage of the aircraft.

In order to reload an aircraft with new rocket drums, the access panel 150 is detached to expose the drums 20 and the fire control rod 93 is disengaged from the carriage 94. The drum 20 is then indexed to a release position, as described in the procedure outlined above, and the control rod 144 moved to release position X3 to disengage hooks 132 and 133 from rollers 130, whereby the drum 20 will be permitted to be moved out of the aircraft bay guided by the trackways 128.

A preloaded rocket drum may be carried over and raised into a position onto the trackways 128 by means of a rocket loading cart (not shown) and the control rod 144 moved to a load position X2. The drum, in a properly aligned position so that the tongue 51 of fitting 27 may be slid into slot 49, is forced upward until hooks 132 and 133 engage rollers 130 and the tongue 51 engages and slides into slot 49. The drum is then locked in position by moving the control rod 144 to the X1 or lock position, and the fire control rod 93 is connected with the carriage 94. Rocket bay access panel 150 is then replaced thus completing the rearming of an aircraft in a matter of minutes, a factor of great importance under actual combat conditions.

After the fully loaded drum has been locked in position on the track guides the firing of the rockets is under the complete control of the aircraft operator who manually controls the energization of the actuator 33 and the control rod 93. As the aircraft operator approaches the target area preparatory to firing the rockets the actuator 33 is energized to start the rotation of the rotor. When the target is sighted the operator aligns the path of flight of the aircraft with the desired path of flight of the rocket to strike the target at dead center and then moves the control rod 93 to the "firing" position as soon as the desired firing range is attained. The trigger 92 engages the lever 89 to withdraw the locking pin 74 from the aperture 71 and cause the spring pressed ejectors to expand and propel the rockets outwardly through the opening in the drum and through the trap door in the aircraft. The camming disc 88 imparts oscillatory motion to the hammer 91 to cause the trigger 92 to continue to fire the ejectors until the hand control rod 93 is moved to the "off" position. In this manner a large number of rockets may be directed at the target for a short interval of time and since the path of flight of the rockets approximates the path of flight of the aircraft a high degree of accuracy is attainable.

Obviously many modifications and variations of the present invention are possible in the light of the above teachings. It is therefore to be understood that within the scope of the appended claims the invention may be practiced otherwise than as specifically described. The invention disclosed herein is a continuation-in-part of copending application Serial No. 293,742 filed June 16, 1952, now abandoned.

What is claimed is:

1. A device for launching rockets from an aircraft in flight comprising a pair of drums each having a longitudinally disposed opening therein and mounted on opposite sides of the aircraft within the body thereof, a rotatable member disposed within each of said drums, driving means including a reversing device operatively connected to said members for rotating the members in an opposite direction with respect to each other, a plurality of casings radially mounted on each of said members and rotatable therewith, a normally locked plunger slidably supported within each of said casings, movable means slidably mounted on said rotatable members in engagement with each of said plungers for releasably locking said plungers in an initial position and for releasing the plungers as the movable means is moved a predetermined amount, camming means secured to each of said rotatable members and rotatable therewith, actuating means pivotally mounted on said camming means and cooperating with complementary means pivotally mounted on said drums and operated in response to the rotation of said camming means for moving said movable means said predetermined amount to release said plungers in a predetermined sequence and at predetermined intervals, and resilient means disposed within said casings in engagement with said plungers for ejecting the rockets from opposite sides of the aircraft through the opening in each drum as the plungers are released.

2. A device for launching rockets from an aircraft in flight comprising a pair of fixed drums each having a longitudinally disposed opening therein and mounted on opposite sides of the aircraft within the body thereof, an elongated rotatable member disposed within each of said drums, means including a gear train operatively connected to each of said members for rotating the members in opposite direction with respect to each other, a plurality of casings fixedly and radially mounted on each of said members and rotatable therewith, a normally locked plunger slidably supported within each of said casings, an arcuate member on one end of each of said plungers for maintaining and supporting rockets in circumferentially spaced alignment with respect to said members, locking means including yieldable members in engagement with the other end of each of the plungers for maintaining the plungers in a locked condition and for releasing said plungers as the locking means are moved a predetermined amount, camming devices secured to each of said members and rotatable therewith, actuating means pivotally mounted on said camming devices and cooperating with complementary means pivotally mounted on said drums and operable in response to the rotation of said camming devices for moving said locking means said predetermined amount to release said plungers, and yieldable means disposed within each of said casings in engagement with the plungers and the casings for moving said plungers and arcuate members an amount sufficiently to eject the rockets from the aircraft through the openings in the drums as said plungers are released.

3. In a device for launching rockets from an aircraft in flight, a rocket carrying drum having an elongated longitudinally disposed opening therein and slidably mounted within the body of the aircraft, a rotor centrally disposed within said drum and extending longitudinally thereof, a plurality of cylindrical casings secured to and radially mounted on said rotor, a normally locked ejector slidably disposed within each of said casings and having a rocket support on one end thereof, a camming disc having mutually spaced apertures therein and secured to and rotatable by said rotor, a bell-crank lever pivotally mounted adjacent one of each of said apertures and having one end thereof extending therethrough, a plurality of rods slidably mounted on said rotor and each having one end thereof connected to the other end of the bell-crank lever individual thereto, a locking pin connected to the other end of each of said rods in locking engagement with one of each of said ejectors for releasably maintaining said ejectors in a locked condition, a lever pivotally mounted on said drum, a trigger carried by said drum and movable sequentially into engagement with said one end of the bell-crank levers for sequentially moving said rods an amount sufficiently to withdraw the pins from locking engagement with said ejectors, means carried by said lever in engagement with said disc and actuated thereby for moving said trigger into engagement with said one end of the bell-crank levers as said disc rotates, and means disposed within said casing in engagement with said casing and ejectors for ejecting the rockets through the opening in successive order as the ejectors are released.

4. A rocket launching device for aircraft comprising a pair of mutually spaced track guides secured to the aircraft, a drum having a wall on each end thereof and a longitudinally disposed opening therebetween, said drum being releasably and slidably mounted on said track guides, a rotor centrally disposed within said drum, an arm pivotally mounted on each of said track guides exteriorly of said drum adjacent each of said walls and movable from a first position to a second position, a pair of mutually spaced members pivotally mounted on each of said arms and having one end thereof connected thereto and a hook on the other end thereof, roller means secured to each of said walls adjacent each of said arms and said pairs of members, said hooks on said members being moved into locking engagement with said roller means by said arms for locking said drum and the rotor in a predetermined position on said track guides when said arms are moved from said first position to said second position, a manually actuated rod pivotally connected to each of said arms for releasing said hooks from locking engagement with said roller means as said arms are moved from said second position to said first position, a driving mechanism carried by said aircraft, socket means on said driving mechanism, complementary means on said rotor in engagement with said socket means for providing a driving connection therebetween when said drums and rotors are locked in said predetermined position, said complementary means being movable out of engagement with said socket means to allow free rotation of said drums to facilitate removal and replacement of said drums.

5. A device for launching missiles from an aircraft in flight comprising a drum having a longitudinally disposed opening therein and secured within the body of the aircraft, a sleeve disposed within and rotatably mounted on said drum, a plurality of supports secured to and rotatable with said sleeve for maintaining the rockets in circumferentially spaced parallel alignment with said sleeve within said drum, a plurality of cylinders secured to and radially disposed on said sleeve and rotatable therewith, a normally locked plunger disposed within each of said cylinders and having a rocket detachably supported on one end thereof, locking means including a locking detent in engagement with the other end of each plunger for releasably locking said plungers to said cylinders, a cam disc secured to said sleeve and rotatable therewith, a plurality of members pivotally mounted on said cam and connected to each of said locking means, a lever pivotally mounted on said drum, a stud carried by said lever in engagement with said cam disc for imparting oscillatory movement to said lever, a trigger on said lever and movable into engagement with said member at predetermined intervals as said stud rides along the cam disc for moving said locking means an amount sufficient to move the detent out of locking engagement with the plungers in successive order, means in said cylinders in engagement with said plungers for ejecting the rocket through the opening as the plungers are released, means including a laniard conductor secured to each of the rockets to prevent the ignition of the rocket for a predetermined period of time after the rocket has been ejected from said aircraft, and ignition means including a movable conducting element operatively connected to said laniard conductor for firing the rocket when said rocket has traveled a predetermined distance from said aircraft.

6. A device for launching rockets from an aircraft in flight comprising a drum having a longitudinal opening therein and secured within the body of the aircraft, a member rotatably mounted within said drum, a plurality of supports secured to said member for maintaining the rockets in circumferentially spaced parallel alignment with said member, a plurality of normally locked ejectors radially mounted on said member and rotatable therewith, each ejector supporting a rocket, means including a plurality of yieldable detents in locking engagement with said ejectors respectively for maintaining said ejectors in a locked condition, means pivotally mounted on said member and connected to each of the detents and movable a predetermined amount for moving said detents to an unlocked position to release said ejectors, means on each of said ejectors for moving the ejectors an amount sufficiently to eject their respective rockets through the opening in the drum as the ejectors are released, means including a disc carried by said member and rotatable therewith for moving said pivotally mounted means said predetermined amount, a plurality of electrical plugs carried by said member and having contact means disposed therein, a plurality of normally wound conductors having one end thereof secured to said rockets respectively, contact elements carried by the other end of each of the conductors and normally out of engagement with said contact means for establishing an electrical connection between said rocket and contacts when the rockets are ejected from said drum by said ejectors and said normally wound conductors are unwound an amount sufficiently to move said contact elements into engagement with said contact means whereby ignition will occur in time delayed relation with respect to the ejection of the rockets from the aircraft.

References Cited in the file of this patent

UNITED STATES PATENTS

| | | |
|---|---|---|
| 2,348,722 | Boehn | May 16, 1944 |
| 2,440,723 | MacDonald | May 4, 1948 |
| 2,474,841 | Hatfield | July 5, 1949 |
| 2,534,744 | Wardwell | Dec. 19, 1950 |
| 2,534,745 | Wardwell | Dec. 19, 1950 |
| 2,599,555 | Hurt | June 10, 1952 |
| 2,608,132 | Lauritsen | Aug. 22, 1952 |
| 2,609,730 | Bergstrom | Sept. 9, 1952 |
| 2,640,417 | Bjork et al. | June 2, 1953 |
| 2,646,786 | Robertson | July 28, 1953 |
| 2,690,124 | Melick | Sept. 28, 1954 |

FOREIGN PATENTS

| | | |
|---|---|---|
| 457,621 | France | Sept. 22, 1913 |
| 462,571 | France | Jan. 30, 1914 |
| 272,835 | Germany | Apr. 19, 1914 |
| 277,696 | Germany | Aug. 25, 1914 |
| 575,090 | Great Britain | Jan. 2, 1946 |
| 579,310 | Great Britain | May 8, 1946 |
| 118,573 | Sweden | Apr. 8, 1947 |